United States Patent
Seiffert et al.

(10) Patent No.: US 6,599,483 B1
(45) Date of Patent: Jul. 29, 2003

(54) MODEL PRESSURIZED REACTION VEHICLE

(76) Inventors: Volkhard Seiffert, Lüneburger Str. 4, 30880 Laatzen (DE); Gerd Ihlenfeld, Lüneburger Str. 4, 30880 Laatzen (DE)

( * ) Notice: Subject to any disclaimer, the term of this patent is extended or adjusted under 35 U.S.C. 154(b) by 0 days.

(21) Appl. No.: 09/601,193

(22) PCT Filed: Dec. 24, 1998

(86) PCT No.: PCT/DE98/03785
§ 371 (c)(1),
(2), (4) Date: Jul. 28, 2000

(87) PCT Pub. No.: WO99/38608
PCT Pub. Date: Aug. 5, 1999

(30) Foreign Application Priority Data

Jan. 28, 1998 (DE) .......................... 198 03 111

(51) Int. Cl.⁷ ................................. B01J 19/00
(52) U.S. Cl. .................. 422/129; 422/130; 422/99; 422/240; 422/241
(58) Field of Search ................ 422/99, 130, 240; 203/16, 19; 436/34

(56) References Cited

U.S. PATENT DOCUMENTS

| 2,647,656 A | 8/1953 | Frisch ................. 220/46 |
| 2,971,671 A | 2/1961 | Shakman .................. 220/66 |
| 3,097,768 A | 7/1963 | Tasca ..................... 222/389 |
| 3,204,819 A | 9/1965 | Gurtler ........................ 22/5 |
| 4,670,404 A | 6/1987 | Swift et al. ............... 436/147 |
| 5,229,075 A | * 7/1993 | Fauske ..................... 422/130 |
| 5,932,182 A | * 8/1999 | Blaney ..................... 422/240 |

FOREIGN PATENT DOCUMENTS

| DE | 16 98 461 | 5/1955 |
| DE | 41 39 739 | 9/1992 |

OTHER PUBLICATIONS

Von H. Walser, "Werkstattpraxis im Aluminium–Behaelterbau," Technische Rundschau No. 6; Feb. 11, 1975, pp. 31–32.
Von Horst Voelker, Die funktionelle Bedeutung des Emails, Technische Rundschau No. 40, 1987, pp. 28–33.

* cited by examiner

Primary Examiner—Jill Warden
Assistant Examiner—Brian Sines
(74) Attorney, Agent, or Firm—Foley & Lardner

(57) ABSTRACT

The invention relates to a metal model pressurized reaction vessel for conducting chemical reactions at different pressures, comprising a bowl-shaped bottom part (1) and a soldered lid (2). According to the invention, the outer lid edge (2b) is shaped as a joint edge running parallel to the outer edge of the bowl-shaped bottom part. The lid (2) and the bowl-shaped bottom part (1) are soldered only on the outer edge.

16 Claims, 3 Drawing Sheets

MODEL PRESSURIZED REACTION VEHICLE

The invention relates to a model reaction pressure vessel made of metal for carrying out chemical reactions at various pressures, having a cup-shaped bottom part and a welded-on lid, and to a reaction arrangement consisting of an autoclave and such a reaction pressure vessel inserted into the autoclave. In particular, the invention relates to such a reaction pressure vessel of the aforesaid type which is provided with various built-in components and lid mountings and permits a pressure correction, the feeding of reagents and a temperature measurement and pressure measurement in the reaction pressure vessel.

Cylindrical metal vessels are normally used as model reaction pressure vessels on a laboratory scale for testing chemical reactions. In most chemical companies, such model reaction pressure vessels are preferably used in a standardized size of about 50 mm diameter and with an equally large height in order to create uniform boundary conditions and thus comparable test conditions.

In this case, the model reaction pressure vessels serve to simulate reactors which are used on a large industrial scale for carrying out chemical reactions. In such reactors for chemical reactions, chemical preparations are made to react with one another, in which case, during the subsequent reaction, pressures which generally can only be affected slightly from outside occur in the interior space of the reactor. In order to be able to reconstruct such chemical reactions on a model scale, model reaction pressure vessels having a relatively thin wall must be used so that the mass of the wall has as little effect as possible on the chemical reactions, in particular also on the temperature of the chemical reactions. When thin walls are used for the model reaction pressure vessel, however, the pressure produced in the reaction pressure vessel, which pressure may partly increase very rapidly during chemical reactions, can generally no longer be absorbed. Therefore such model reaction pressure vessels are inserted into autoclaves, so that the pressure difference between the interior space of the model reaction pressure vessel and the interior space of the autoclave can be kept small by appropriate control of the pressure in the interior space of the autoclave. Thus generally only relatively small pressure differences act on the walls of the model reaction pressure vessel. Since the readjustment of the pressure in the interior space of the autoclave is carried out with a corresponding deviation and time delay, a vacuum relative to the interior space of the autoclave may also occur in the interior space of the model reaction pressure vessel.

At present, model reaction pressure vessels are produced by the cylindrical wall first of all being bent from sheet metal and being butt welded longitudinally. The lid and the base are produced from flat sheet-metal blanks, the margin of which is given a raised flange. They are then inserted into the sheet-metal cylinder and are flange or seam welded.

This production sequence has several disadvantages. At the longitudinal seam and during the flange welding with the arc welding process, scale formation in the vessel interior cannot be avoided. The scale layer has an effect on the chemical reaction of the test medium and leads to non-reproducible results.

A wedge-shaped dead space is produced between the base or the lid and the side wall by the flanging, and this dead space traps, for example, non-reactive gas residues after the vessel has been filled. Furthermore, this dead space may lead to incomplete mixing of a plurality of reaction partners poured in one after the other. This results in an inhomogeneous mixture ratio, which impairs the reaction and thus the test results.

Furthermore, the thermodynamic equilibrium will be affected by the gas trapped in the dead space as non-reactive component.

The dead space and the scale formation are disturbing in particular in the base region, since the vessel is used in the upright position and the reaction components come directly into contact therewith. In the lid region, the disruptive influence is less.

The aforesaid scale layer, which is produced in the vessel interior during the arc welding process, can certainly be avoided to the greatest possible extent by the use of seam resistance welding for joining the lid and base to the cylinder wall. However, on account of the minimum diameter of the rollers of the welding tool, which diameter must not be less than a certain value, pipe connections and the like can only be attached in the lid at a subsequent stage, since these pipe connections and the like otherwise hinder the welding rollers. This means that the pipe connections or the like have to be soldered in place subsequently, with the disadvantage that the ingress of soldering and flux residues into the vessel cannot be avoided. In addition, the soldering material is rigid and does not follow the movements of the more elastic metal under pressure loading. The result of this is that the soldered joint only withstands the pressure loading to a limited extent and in particular that the soldered joint suffers fatigue during operation due to pressure fluctuations.

From the user's point of view, there is a great need to be able to equip the vessels with pipe connections and screw fittings as far as possible individually. This requirement also cannot be fulfilled by the production processes described. The setting-up times are relatively long, so that only the respective production of a very large quantity is viable. The prefabrication of closed universal vessels is also no solution, since the openings for the pipe connections and screw fittings can only be made subsequently by means of piercing the lid and thus not in a true-to-size manner. The problems described with regard to the soldering are further increased and lead to an incalculable risk with regard to the reproducibility of the test results.

On account of the requisite chemical passivity, the vessels are preferably produced from high-grade steel. For reactions with especially aggressive substances, even this material is not sufficiently resistant, especially in the case of reactions which run for several hours. It is therefore desirable to apply coatings in the vessel interior, as also used on a production scale in large reactors (e.g. enameling). This is no longer possible at a subsequent stage in the case of fully welded vessels in the known form. Coating before the welding entails the disadvantage that the coating will be partly destroyed during the subsequent welding or will not withstand the high temperatures, so that decomposition products may pass into the interior space of the vessel.

The object of the invention is to provide a reaction pressure vessel which has the required pressure resistance and in which the abovedescribed problems which occur in the prior art are avoided to the greatest possible extent.

In particular, a reaction pressure vessel which can be used as a reaction vessel and for this purpose can be equipped individually with built-in lid components and lid mountings in an efficient manner even in smaller quantities is to be provided.

Furthermore, a reaction arrangement consisting of an autoclave and a model reaction pressure vessel inserted into the autoclave, in which the problems of the prior art are largely avoided, is to be provided.

This object is achieved by a model reaction pressure vessel as claimed in claim 1.

On account of the one-piece construction of the bottom part, all the disadvantages which are associated with the welding-in of the base are avoided. These are essentially the scale layers and the dead space between base and vessel wall. In addition, the pressure retaining strength in the case of a one-piece construction is markedly higher. It is thus possible to design a reaction pressure vessel which has a small wall thickness and in which the effect of the wall of the reaction pressure vessel on the chemical reactions can be kept slight.

The lid is welded onto the cup-shaped bottom part. The special lid form according to the invention achieves the effect that the scale formation remains very small during the welding of the lid to the bottom part. The reason for this lies in the fact that the lid is inserted with the joint edge into the bottom part in such a way that the outer lid margin bears parallel against the side wall of the bottom part. Since the weld connects only the outer margin of lid and cup-shaped bottom part, the weld is supported by the those regions of the lid margin and bottom part which bear against one another.

A further advantage of the lid design according to the invention consists in the fact that the weld between lid and bottom part is largely kept free of bending forces when a high positive pressure or vacuum is applied to the pressure vessel. At a high positive pressure, for example, the lid of the reaction pressure vessel arches outward or the entire vessel expands in a "balloon-like" manner. Under these conditions, a weld made in a conventional manner will be subjected to high bending forces. This is avoided in the case of the shaping proposed according to the invention at the lid margin, as a result of which the pressure stability can be increased considerably.

To weld the lid and bottom part at the respectively outer margin, the laser welding process may be advantageously used instead of the otherwise conventional arc welding. As a result, a very narrow, but at the same time stable, weld can be obtained, and a scale formation in the vessel interior can be avoided to the greatest possible extent.

An additional supporting ring is preferably mounted around the cup-shaped bottom part at its top edge at the level of the lid. The supporting ring is arranged in such a way that, as viewed from the bottom part, it lies exactly opposite the lid margin. The top or outer edges of the supporting ring, of the bottom part and of the lid are in contact with one another and are welded in this position.

The supporting ring gives the weld additional stability. This may be desirable in particular when the vessel is to be designed with walls which are as thin as possible. If the cup-shaped bottom part is produced by deep drawing, as in a preferred exemplary embodiment, the material thickness at the base of the bottom part is greater than in the side wall. The side wall, which is then very thin, is reinforced by the supporting ring at the level of the weld. The supporting ring, which is made in the same thickness as the lid, additionally serves as a weld filler during the pressure-tight welding of the thin-walled vessel.

In a development of the invention, a chemically passive sealing agent may be applied between lid and bottom part before assembly, this sealing agent filling the dead space in the bottom region of the joint edge after assembly. Due to the relatively small input of energy during the laser welding, the sealing agent is not damaged.

The lid may preferably be constructed with one or more flutes. The advantage of this lid design according to the invention consists in the fact that the weld between lid and bottom part is kept free of bending forces to an even greater extent when positive pressure or vacuum is applied to the reaction pressure vessel. At a high positive pressure, for example, the lid of the pressure vessel arches outward.

Under these conditions, a weld made in a conventional manner will be subjected to high bending forces. However, due to the shaping according to the invention, this is avoided even more effectively by deep-drawn flutes, as a result of which the pressure stability can be increased considerably.

The reaction pressure vessel, if need be, could also be produced from a material other than metal, provided this material can be joined or welded in a gas-tight and pressure-tight manner. For cost reasons alone, however, only metal, in particular steel and high-grade steel, are suitable at present.

In order to enable the reaction pressure vessel, as model reactor, to be equipped individually with built-in lid components, provision is made in a development of the invention for the lid to be provided with necked portions or to be equipped with welding sleeves, which are passed through corresponding bores. Inserts, such as pipe connections or the like, may be inserted into the necked portions or welding sleeves and may be welded at their margin with a flush weld. The necked portions or welding sleeves avoid a situation in which the associated inserts have to be soldered in place in lid apertures. This design according to the invention avoids the known disadvantages of a soldered joint. Welding offers substantially higher strength and corrosion resistance for the use of the built-in lid components.

An advantage of the invention is that the basic components—bottom part, lid and if need be supporting ring—are identical for all applications and can therefore be prefabricated cost-effectively in large quantities. The equipping of the lid, e.g. with welding sleeves, pipe connections, screw fittings, etc., may be effected individually for each use without increased expenditure.

If desired, the bottom part may be provided at least partly with a lining. Especially in the event of contact with aggressive liquids, the regions in contact with the fluid can be protected by linings. Enameling or various synthetic coatings, for example, are suitable for this purpose.

For special uses, in particular in the case of highly aggressive fluids, an insert vessel—a so-called inliner—which is preferably made of glass or ceramic, may additionally be inserted into the bottom part before the closing and the laser welding. In addition, the built-in components in contact with the fluid, such as pipe connections for example, may be provided with a chemically passive coating in order to protect them.

If an inliner is provided, it is advantageous to provide the lid of the reaction pressure vessel with a catch lug, which acts on the inliner in such a way that the latter cannot be displaced inside the bottom part.

The bottom part may be equipped with built-in components or inserts, e.g. with partition walls, perforated plates, agitators, etc. In this way, the range of reactor types which can be represented is markedly expanded.

The invention is explained in more detail below with reference to some exemplary embodiments.

FIG. 1 shows a reaction pressure vessel in the form of a model reactor, which consists of bottom part 1, a lid 2 with joint edge, and a supporting ring 3 as basic components.

Figure 1:
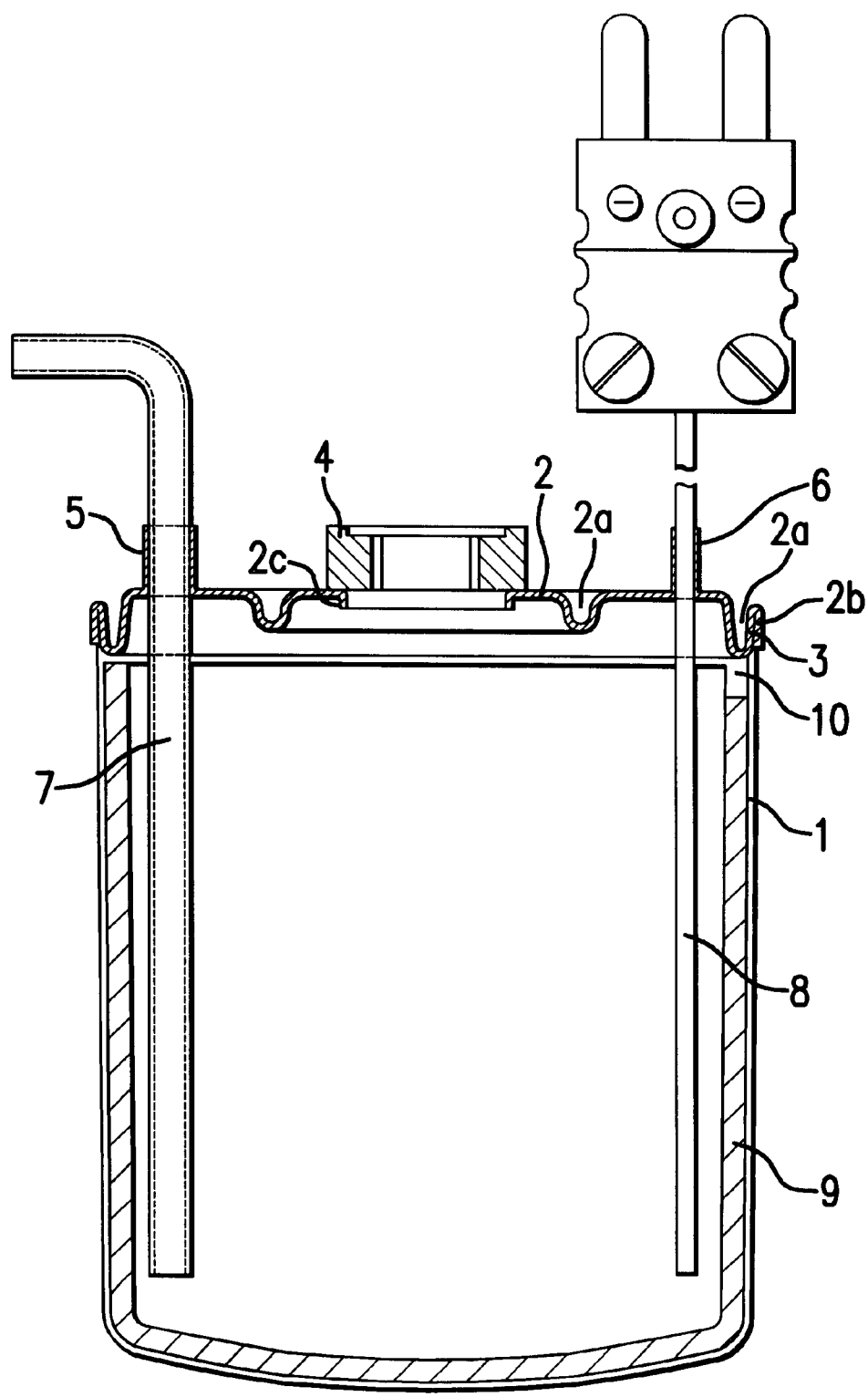
Figure 2:
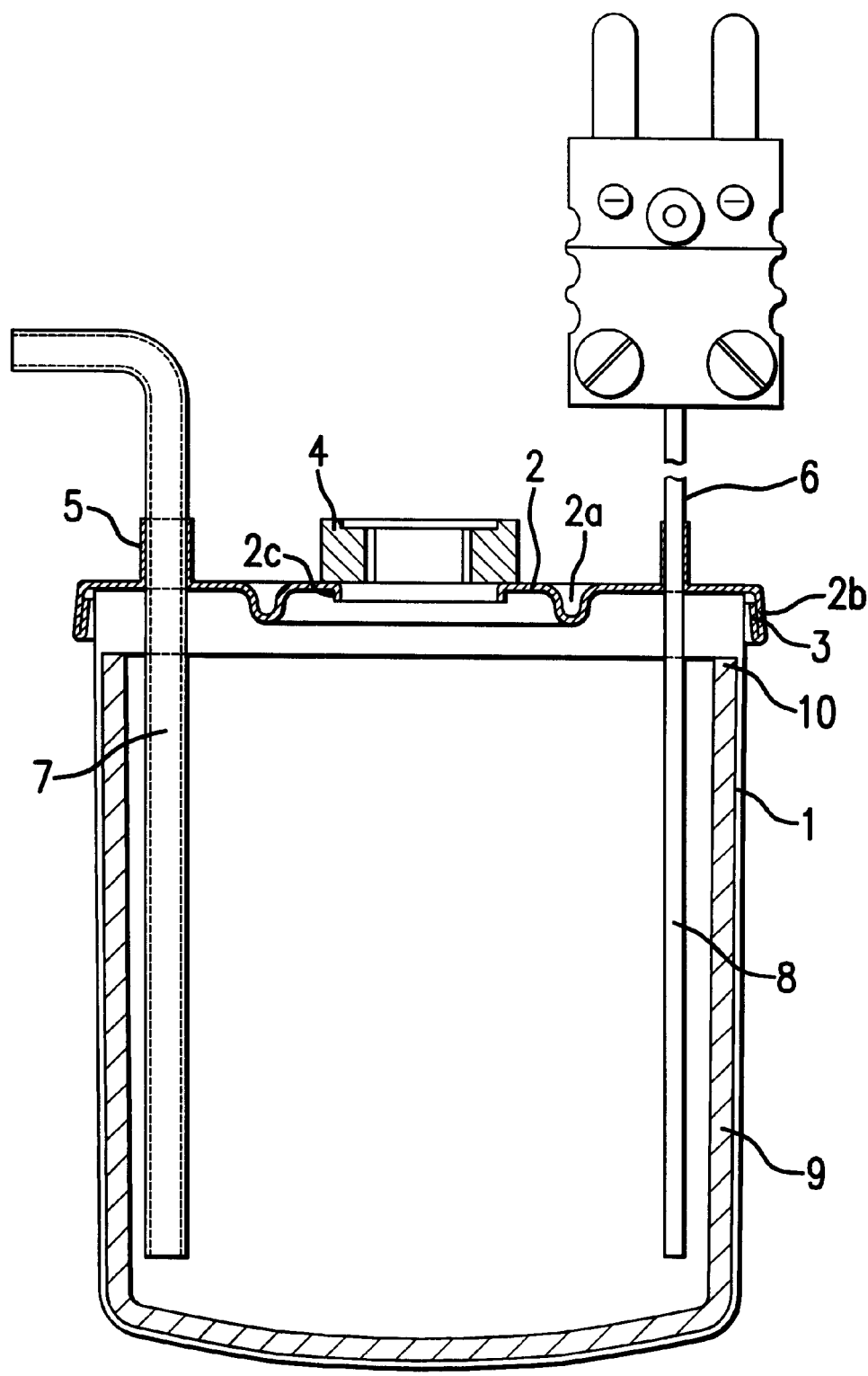
FIG. 2 shows another exemplary embodiment of the reaction pressure vessel with mounted lid 2.

The exemplary embodiments shown in FIGS. 1 and 2 are provided with a screw fitting 4 and welding sleeves 5 and 6. A pipe connection 7 is passed through the welding sleeve 5 and is inserted [sic] with a flush weld at the top margin of the welding sleeve 5. A thermocouple 8 likewise welded in place is passed through the welding sleeve 6. Furthermore, the reaction pressure vessels are provided with an inliner 9 made of glass or ceramic. Attached to the lid 2 is a catch lug 10, which engages in the inliner in such a way that the latter cannot be displaced inside the bottom part 1. The screw fitting 4 is welded to the necked portion 2c of the lid.

The reaction partners can be fed or added in a metered manner via the pipe connection 7 and the screw fitting 4. If especially aggressive reaction partners are used, it may also be advantageous to form the pipe connection 7 from ceramic or glass or a similar inert material at its bottom end in contact with the fluid.

During the test operation, the vessel is generally inserted into an autoclave, where it is kept at the right temperature by external heating conductors. The pressure vessel itself is to have a pressure retaining strength of several bar; higher pressure differences are compensated for by controlling the pressure in the autoclave.

During use in the autoclave, further reaction components are supplied via the pipe connections 7. Unlike in the exemplary embodiments shown, a plurality of pipe connections 7, via which, if need be, reaction products may also be drawn off, may also be provided. The thermocouple 8 serves to record the thermal reaction profile.

The lid 2 of the pressure vessel shown in FIG. 1 is provided with two encircling flutes 2a, specifically at its outer margin and around the screw fitting 4. The necked portion 2c is shown below the screw fitting 4.

In FIG. 2, the lid 2 is mounted in position on the bottom part. As a result, the flute running at the outer margin in the example according to FIG. 1 is dispensed with and the lid is stabilized solely by the flute around the screw fitting 4.

In the two examples shown, the deep-drawn cup-shaped bottom part 1 has a wall thickness of 0.3 mm in its base region, whereas the side wall has a wall thickness of only about 0.15 mm. The lid has a wall thickness of 0.3 mm, as does the supporting ring. The encircling flute 2a is about 3–5 mm deep, so that the outer lid margin 2b in the region which bears parallel against the bottom part 1 is about 3 mm wide. In alternative exemplary embodiments, the model reactor ma y be provided with further or other built-in components and inserts.

Figure 3:
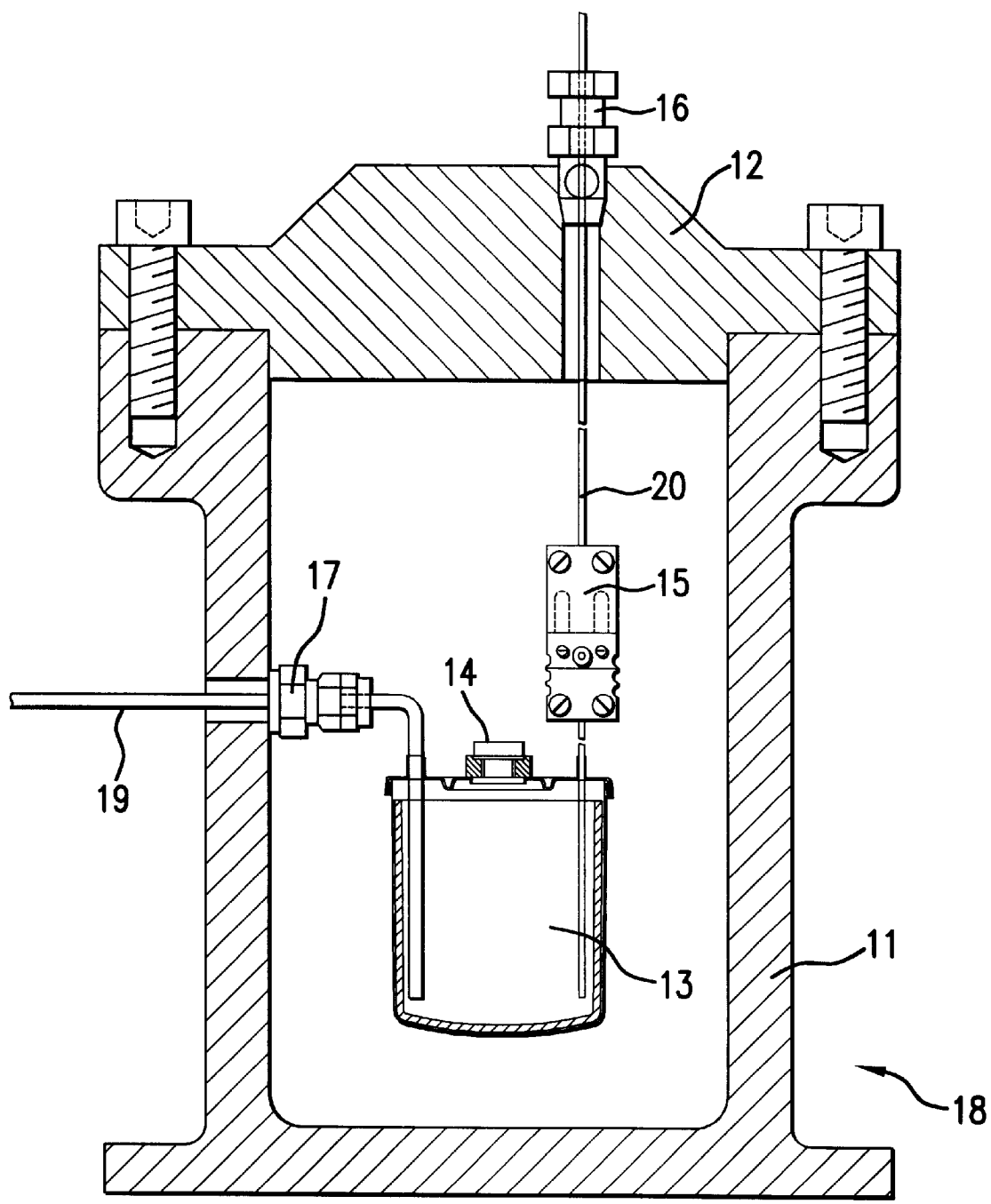
FIG. 3 shows a reaction arrangement according to the invention for the modeled simulation of chemical reactions with an autoclave and a reaction pressure vessel.

According to FIG. 3, the model reaction pressure vessel 13 is inserted into an autoclave 18. The autoclave 18 has a bottom part 11 and a lid 12, which are screwed to one another. The model reaction pressure vessel is closed with a screw 14. The thermocouple of the reaction pressure vessel is connected to the exterior space, via a coupling 15, a line 20 and a screw fitting 16, which produces a pressure-tight seal of the interior space of the autoclave, so that the temperature can be measured from outside via the line 20. According to FIG. 3 the pipe connection 7 located in the model reaction pressure vessel according to FIGS. 1, 2 is connected to the exterior space via a pipe line 19. The pipe line 19 is led out of the autoclave in a pressure-tight manner via a screw fitting 17. Via the pipe line 19, the pressure in the interior space of the reaction pressure vessel 13 can be measured on the one hand and/or reagents can be directed into the interior space of the reaction pressure vessel 13. These reagents may be starting materials for the chemical reactions or also reaction accelerators or reaction inhibitors.

What is claimed is:

1. A model reaction pressure vessel made of metal for inserting into an autoclave for carrying out chemical reactions at various pressures, having a one piece cup-shaped bottom part (1) and a welded-on lid (2), wherein the outer lid margin (2b) is designed as a joint edge so as to run parallel to and lie adjacent to the outer circumferential surface of the cup-shaped bottom part, and wherein the lid (2) and the cup-shaped bottom part (1) are welded only at the outer circumferential surface, and wherein a supporting ring (3) is mounted around the outer circumferential surface of the cup-shaped bottom part (1), and this supporting ring (3) as viewed from the bottom part (1), lies opposite the lid margin (2b), the lid margin (2b), bottom part (1) and supporting ring (3) being welded together, wherein the lid (2) is equipped with necked Portions (2c), or welding sleeves (5, 6), wherein inserts, such as screw fittings (4) or pipe connections (7), are inserted into the necked portions, or welding sleeves, and are welded to the necked portions or welding sleeves.

2. The model reaction pressure vessel as claimed in claim 1, wherein the lid (2) is provided with one or more concentrically encircling flutes.

3. The model reaction pressure vessel as claimed in claim 1, wherein the inserts, such as screw fittings (4), or pipe connections (7), are provided with a chemically passive coating at least in their bottom part in contact with the fluid.

4. The model reaction pressure vessel as claimed in claim 1, wherein the bottom part (1) as at least partly provided with a lining.

5. The model reaction pressure vessel as claimed in claim 1, wherein a chemically passive sealing agent is applied in the region of the connection between lid and bottom part.

6. The model reaction pressure vessel as claimed in claim 1, wherein an insert vessel (inliner (9)), preferably made of glass or ceramic, is inserted into the bottom part (1).

7. The model reaction pressure vessel as claimed in claim 6, wherein the lid (2) is provided with a catch lug (10), which engages on the inliner (9) in such a way that the latter cannot be displaced inside the bottom part (1).

8. The model reaction pressure vessel as claimed in claim 1, wherein the bottom part (1) is equipped with built-in components or inserts.

9. The model reaction pressure vessel as claimed in claim 1, wherein said vessel is capable of functioning in the positive-pressure range and the vacuum range.

10. A reaction arrangement for carrying out chemical reactions at various pressures, having an autoclave (18) and a model reaction pressure vessel (13) inserted into the autoclave as claimed in claim 1.

11. The reaction arrangement as claimed in claim 10, wherein a pipe line (19) for supplying materials and/or measuring the pressure in the interior space of the model reaction pressure vessel (13) runs from outside through the autoclave (18) into the model reaction pressure vessel (13).

12. The reaction arrangement as claimed in claim 10, wherein a thermocouple (8) in the interior space of the model reaction pressure vessel (13) is connected to an electric line (20), which runs to the outside through the autoclave (18).

13. The reaction arrangement as claimed in claim 10, wherein the pressure in the interior space of the autoclave (18) can be controlled as a function of the measured pressure in the interior space of the model reaction pressure vessel (13) in such a way that a pressure difference between the interior space of the autoclave (18) and the interior space of the model reaction pressure vessel (13) is kept small.

14. A model reaction pressure vessel according to claim 1, wherein a wall thickness of the cup-shaped bottom part is about 0.3 mm.

15. A model reaction pressure vessel according to claim 1, wherein the outer margin of the lid depends in a downward direction.

16. A model reaction pressure vessel according to claim 15, wherein an inner margin of the lid extends in an upward direction opposite the outer margin of the lid.

\* \* \* \* \*

UNITED STATES PATENT AND TRADEMARK OFFICE
CERTIFICATE OF CORRECTION

PATENT NO. : 6,599,483 B1
DATED : July 29, 2003
INVENTOR(S) : Volkhard Seiffert and Gerd Ihlenfeld It is certified that error appears in the above-identified patent and that said Letters Patent is hereby corrected as shown below:

<u>Title page, Item [54] and Col. 1, line 2,</u>
Title, please delete "VEHICLE" and insert -- VESSEL --.

Signed and Sealed this

Twenty-seventh Day of January, 2004

JON W. DUDAS
*Acting Director of the United States Patent and Trademark Office*